(12) United States Patent
Nolley

(10) Patent No.: US 6,220,302 B1
(45) Date of Patent: Apr. 24, 2001

(54) CHAMBERED LEAK REPAIRING DEVICE AND METHOD

(76) Inventor: Jim B. Nolley, 17027 Highworth, Spring, TX (US) 77379

(*) Notice: Subject to any disclaimer, the term of this patent is extended or adjusted under 35 U.S.C. 154(b) by 0 days.

(21) Appl. No.: 09/492,676

(22) Filed: Jan. 27, 2000

(51) Int. Cl.$^7$ .................................................. F16L 55/16
(52) U.S. Cl. ................................. 138/99; 139/97; 285/373
(58) Field of Search ......................... 138/99, 97; 285/373

(56) References Cited

U.S. PATENT DOCUMENTS

| | | | |
|---|---|---|---|
| Re. 17,166 | 12/1928 | De La Mare | 138/97 |
| 549,594 | 11/1895 | Cooper et al. | 138/99 |
| 573,491 | 12/1896 | Smith | 138/99 |
| 631,867 | 8/1899 | Beaver | 138/99 |
| 732,400 | 6/1903 | Dresser et al. | 138/99 |
| 793,135 | 6/1905 | Kellogg | 285/373 |
| 1,343,463 | 6/1920 | Meredith | 138/99 |
| 1,737,181 | 3/1929 | Woodward | 138/97 |
| 2,230,287 | 2/1941 | Curtis | 138/99 |
| 3,189,970 | 6/1965 | Barr | 24/284 |
| 3,432,188 | 3/1969 | Turner | 138/99 |
| 3,960,181 | 6/1976 | Baur et al. | 138/99 X |
| 4,043,333 * | 8/1977 | Munsch | 138/103 X |
| 4,111,234 * | 9/1978 | Wells et al. | 138/99 |
| 4,202,379 | 5/1980 | Vetter | 138/99 |
| 4,273,364 * | 6/1981 | De Lange | 138/99 X |
| 4,326,735 | 4/1982 | Hunder et al. | 285/15 |
| 4,357,961 | 11/1982 | Chick | 138/97 |
| 4,391,458 * | 7/1983 | Blakeley | 285/112 |
| 4,448,218 | 5/1984 | Vetter | 138/99 |
| 4,552,183 | 11/1985 | Chick | 138/99 |
| 4,568,091 | 2/1986 | Harrison | 285/373 X |
| 4,576,401 | 3/1986 | Harrison | 138/99 X |
| 4,653,782 * | 3/1987 | Munday | 285/373 |
| 4,789,189 * | 12/1988 | Robertson | 285/197 |
| 4,949,744 * | 8/1990 | Heed et al. | 138/97 X |
| 5,040,828 * | 8/1991 | Kane | 285/197 |
| 5,086,809 | 2/1992 | Bridges | 138/99 |
| 5,358,286 | 10/1994 | Eaton et al. | 285/197 |
| 5,362,107 | 11/1994 | Bridges | 285/373 X |
| 5,383,496 | 1/1995 | Bridges et al. | 138/99 |
| 5,413,385 | 5/1995 | Hilbush, III | 285/294.2 X |
| 5,443,096 | 8/1995 | King | 138/99 |
| 5,505,497 | 4/1996 | Shea et al. | 285/55 |
| 5,853,030 * | 12/1998 | Walding | 138/99 |

* cited by examiner

*Primary Examiner*—Patrick Brinson
(74) *Attorney, Agent, or Firm*—Sue Z. Shaper; Felsman, Bradley, Vaden, Gunter & Dillon, L.L.P.

(57) ABSTRACT

A device method for repairing leaks in pressurized lines, particularly refrigeration lines, without having to drain the fluid from the line, thereby reducing the possibility of refrigerant contamination and/or loss, and providing protection to the environment. The device of this invention is installed over a leak in the line and remains in service for the life of the line.

15 Claims, 6 Drawing Sheets

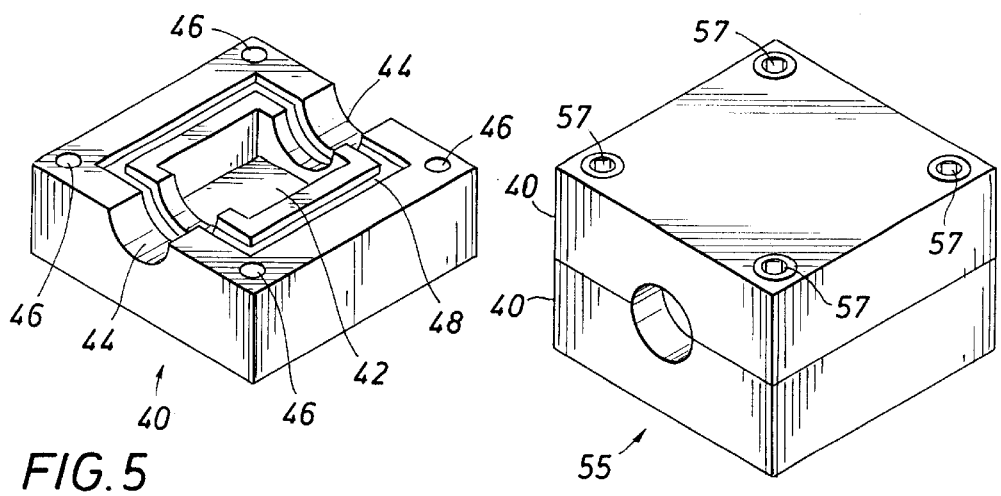
FIG. 5
FIG. 6
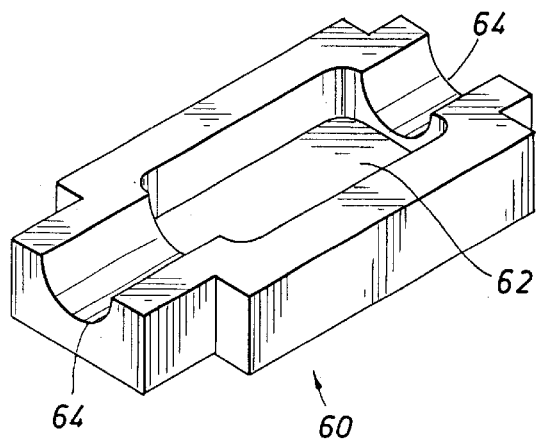
FIG. 7
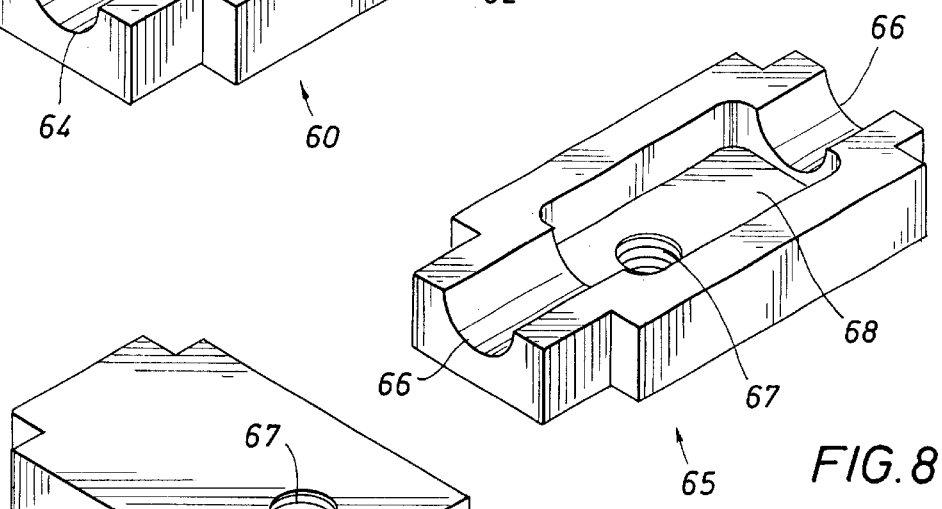
FIG. 8
FIG. 9

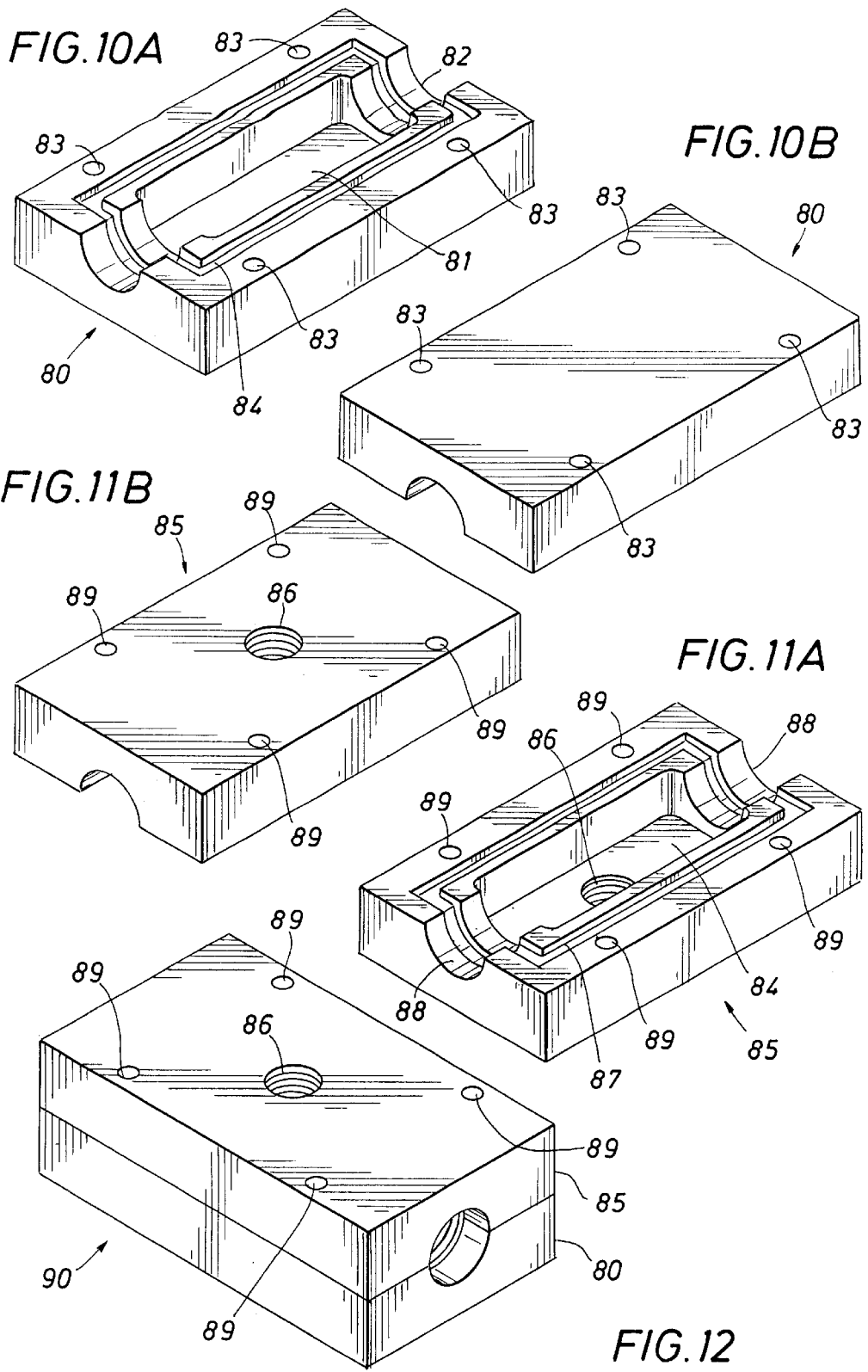

CHAMBERED LEAK REPAIRING DEVICE AND METHOD

FIELD OF INVENTION

The present invention relates to means for repairing leaks in pressurized lines without having to drain the fluid from the line, and more particularly to repairing leaks in refrigeration system tubing joints and tubing tees.

BACKGROUND OF INVENTION

The standard practice of repairing leaks in high pressure lines and refrigeration tubing, both consumer and industrial, typically requires that the fluid be drained from the line prior to repair. This is due to the high pressure in refrigeration systems and the nature of the chemicals and refrigerants involved. Careful draining of the line to be repaired is time-consuming and expensive. Also, the draining of refrigerant chemicals can result in contamination of the systems and the environment as well as the loss of expensive refrigerant chemicals.

The present invention proposes to solve these time consuming and expensive procedures which pose environmental hazards by providing a method by which high-pressure refrigeration lines and/or air conditioning tubing may be repaired while remaining under high pressure and without draining the lines or tubing. A chambered leak repairing device and method is taught in which a leak in any type of tubing, such as copper tubing and the like, is encased in a chamber that is sealed and left on the line for the life of the system. The chambered leak repairing device may be applied to straight tubing, or tubing having fittings such as 90 or 45 degree turns, tees, or reducing tees. The device may be sealed by compressing a gasket between housing-to-housing portions and housing-to-tubing portions around the tubing to be repaired. Alternately, a leak repairing device may be sealed by brazing/soldering housing-to-housing portions and housing-to-tubing portions. A mixed strategy of gasket/packing and brazing/soldering could be utilized.

A gasket used to seal the chambered leak repairing device should be of a material, such as Teflon®, that is able to withstand contact with refrigerant chemicals, high pressure, possibly high temperature and the outside elements without disintegrating over the life of the system. A variety of brazing and/or soldering methodologies may be employed. However, a low temperature soldering is preferred.

The chambered leak repairing device and method of this invention discloses a means for puncturing the tubing to be repaired subsequent to sealing a chamber around a leaking portion of such tubing. The tubing may be under high or low pressure. Means for puncturing the tubing to be repaired will reduce any pressure differentials that might arise between the chamber and a small leaking portion of the tubing.

The device and method of this invention may also provide for a bleed port to vent leaking pressurized fluid while the housing is being sealed around a leaking portion. A vent port structure can be incorporated with a puncturing device to advance and puncture the tubing subsequent to securing the chamber around the tubing. The device and method of this invention may be applied to tubing of between about ⅛ inch OD to about 3 inch OD that could be encountered in refrigeration lines and/or tubing and air conditioning.

When installed on a portion of leaking tubing, the device and method of the present invention becomes a permanent attachment to the tubing.

SUMMARY OF THE INVENTION

A device for repairing leaks in tubing and the like at either high or low pressure, comprising a housing structured to define a chamber that encircles a leaking tubing portion. Means are provided for sealing the housing together and for sealing the tubing to said housing. Means attached to the housing are also provided for puncturing the tubing and/or for venting any excess pressure from the chamber from gases, vapors or liquids.

BRIEF DESCRIPTION OF THE DRAWINGS

A better understanding of the present invention can be obtained when the following detailed description of the preferred embodiments are considered in conjunction with the following drawings, in which:

FIG. 5 shows a perspective view of a housing for a second embodiment of a chambered leak repairing device, having sealing means and a fastening means for bolts, screws, and the like.

FIG. 6 shows a perspective view of an assembled pair of housings of a chambered leak repairing device of FIG. 5, having the fastening means engaged with bolts.

FIG. 7 shows a perspective view of a bottom housing of a third embodiment of a chambered leak repairing device.

FIG. 8 shows a perspective view of the top housing of an embodiment of FIG. 7, having means for puncturing the pipe being repaired and/or venting any excess pressure from gases, vapors or liquids from within a chamber surrounding such pipe.

FIG. 9 shows a perspective view of the assembled bottom and top housings of FIGS. 7 and 8, respectively, having sealing means and means for puncturing the pipe being repaired and/or venting any excess pressure from gases, vapors or liquids from within a chamber surrounding such pipe.

FIGS. 10A and 10B, respectively, show front and back perspective views of a top housing of a fourth embodiment of a leak repairing device of this invention, having sealing means and means for engaging a fastening means.

FIGS. 11A and 11B, respectively, show front and back perspective views of a bottom housing of a fourth embodiment, having sealing means and means for puncturing the pipe being repaired and/or venting any excess pressure from gases, vapors or liquids from within a chamber surrounding such pipe.

FIG. 12 shows a perspective view of the assembled bottom and top housings of FIGS. 10 and 11, respectively, having sealing means and means for puncturing the pipe being repaired and/or venting any excess pressure from gases, vapors or liquids from within a chamber surrounding such pipe.

DETAILED DESCRIPTION OF PREFERRED EMBODIMENTS

A leak repairing device and method of this invention may be better understood by reference to the attached drawings.

Figure 1:
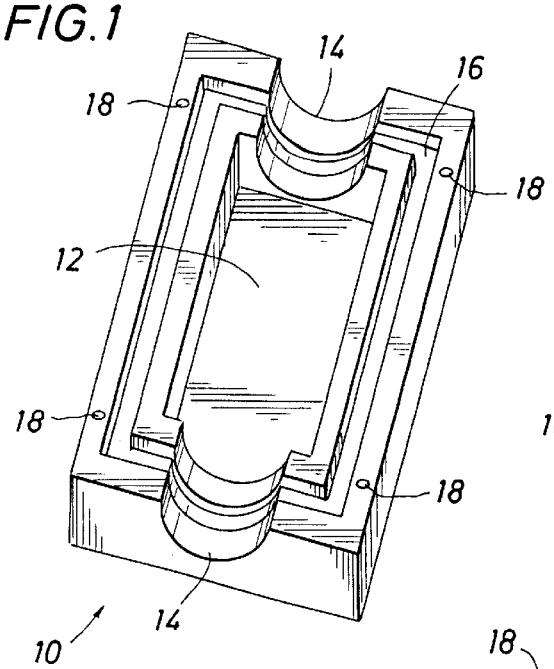
FIG. 1 shows a perspective view of a bottom housing of a chambered leak repairing device of this invention, having sealing means and means for engaging a fastening means.
Figure 2:
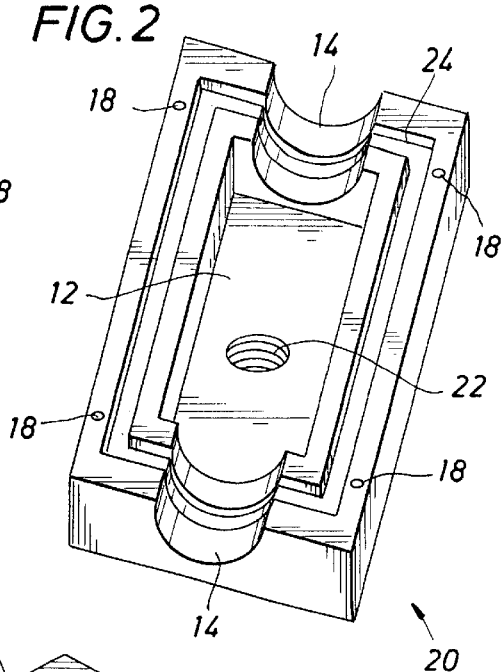
FIG. 2 shows a perspective view of a top housing of the chambered leak repairing device of FIG. 1, having means for puncturing the pipe being repaired and/or venting any excess pressure from gases, vapors or liquids from within a chamber surrounding such pipe, along with sealing means and means for engaging a fastening means.
Figure 3:
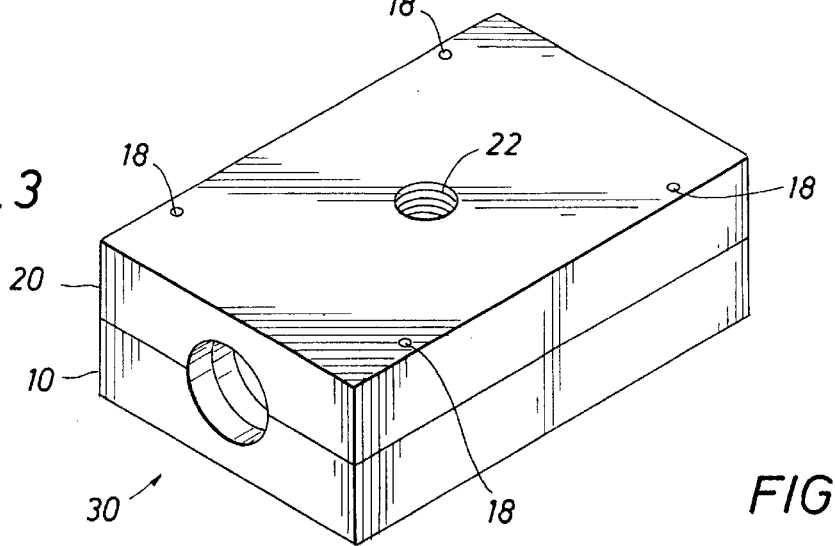
FIG. 3 shows a perspective view of an assembled bottom and top housing of the chambered leak repairing device of FIGS. 1 and 2, having sealing means engaged (not shown).

FIGS. 1 through 3 show preferred embodiments of this invention. In FIG. 1, a bottom housing 10 for a leak repairing device forms a chamber 12 around a portion of a tubing or pipe having a leak. The tubing to be repaired is received by tubing receiving means 14 disposed about the distal ends of chamber 12. Bottom housing 10 has seal receiving means 16 which is shown in FIG. 1 as a groove that encircles chamber 12 and tubing receiving means 14. Seal receiving means 16 is structured to receive a sealing means for chamber 12.

Figure 4A:
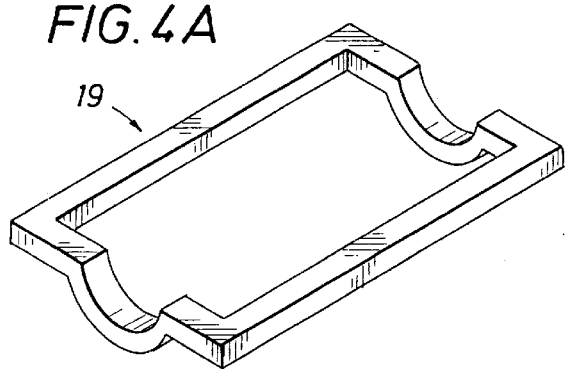
FIG. 4A shows a perspective view of a preferred embodiment of a means for sealing a chamber, such as a gasket.
Figure 4B:
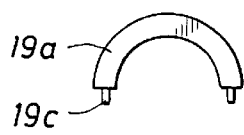
FIGS. 4B and 4C show perspective views of another preferred embodiment of a means for sealing a chamber around a pipe having a leak, such as a split compression ring.
Figure 4C:
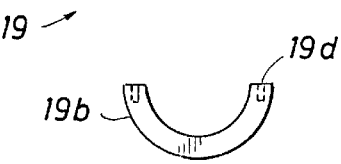

Sealing means 19 for sealing chamber 12, shown in FIG. 4A as a gasket and a split compression ring in FIGS. 4B and 4C, may be fabricated of any suitable material, such as Teflon®, which is capable of sealing the housing at the temperature, pressure, and environmental conditions encountered in and around the tubing to be repaired. The sealing means 19 shown in FIGS. 4B and 4C as a split compression ring may be inserted around the pipe having a leak to form a seal around such pipe. The split compression ring may be comprised of an upper ring 19a having a dowel pin 10c for insertion into holes 19d formed in lower ring 19b. The dowel pin 19c may also receive a teflon seal (not shown) to seal insertion into holes 19d. The sealing means 19 may be used alone or in combination with any embodiment disclosed herein of the leak repairing device and method of this invention.

In FIG. 2, a top housing 20 is shown for a leak repairing device of this invention having puncturing and/or venting means 22. Top housing 20 has seal engaging means 24 disposed about chamber 12 and pipe receiving means 14. The seal engaging means 24 (FIG. 2), seal means 19 (FIGS. 4A, 4B and 4C), and seal engaging means 24 are structured in combination to seal the chamber 12 and pipe receiving means 14 around the pipe having a leak to be repaired. The tubing receiving means 14 may have a beveled edge to receive sealing means 19 for sealing the chamber 12 and the tubing to be repaired.

In FIG. 3, an assembly of a bottom housing 10 and a top housing 20 of FIGS. 1 and 2, respectively, is shown having fastening means 18. These housings may be joined via fastening means 18 such as by clamps, screws, bolts or the like. Another perspective view of the puncturing and venting means 22 for top housing 20 is shown in FIG. 3.

A second embodiment of a leak repairing device and method of this invention is shown in FIGS. 5 and 6. Housing 40 of FIG. 5 shows a chamber 42 having tubing receiving means 44 disposed at distal ends of the chamber. Seal engaging means 48 is shown disposed about chamber 42 and is structured to receive a sealing means which may be fabricated of any suitable material, such as Teflon®, which is capable of sealing the housing at the temperature, pressure, and environmental conditions encountered in and around the tubing to be repaired. Fastening means 46, such as for a screw, bolt, or the like, are shown disposed about the corners of the housing 50. An assembly of a pair of housings, such as housing 40, is shown in FIG. 6 as assembly 55. Assembly 55 shows fastening means 46 engaged with bolts 57.

A third embodiment of this invention is shown in FIGS. 7 thru 9. In FIG. 7, bottom housing 60 is shown having chamber 62 which is disposed at distal ends by tubing receiving means 64. In FIG. 8, top housing 65 is shown having tube receiving means 66, a puncturing and/or venting means 67, and a chamber 68. An assembly 70 of bottom housing 60 and top housing 65, with puncturing and venting means 67 is shown in FIG. 9. Both housings of assembly 70 may be sealed together via sealing means 72 which may include conventional soldering and/or brazing methods. Dowel pins (not shown) may also be used to hold the assembly together while being sealed.

A fourth embodiment of a leak repairing device of this invention is shown in FIGS. 10 thru 12. In FIG. 10A, front view of a bottom housing 80 having a chamber 81 is disposed at distal ends by tubing receiving means 82. Seal engaging means 84 is structured to receive a sealing means which may be fabricated of any suitable material, such as Teflon®, which is capable of sealing the housing at the temperature, pressure, and environmental conditions encountered in and around the tubing to be repaired. In FIG. 10B, a back view of bottom housing 80 is shown having fastening means 83. In FIG. 11A, a front view of a top housing 85 is shown, having pipe receiving means 88 disposed about distal ends of chamber 84 with puncturing and venting means 86. Seal engaging means 87 is structured to receive a sealing means which may be fabricated of any suitable material, such as Teflon®, which is capable of sealing the housing at the temperature, pressure, and environmental conditions encountered in and around the tubing to be repaired. In FIG. 11B, a back view of housing 85 is shown having fastening means 89 and puncturing and/or venting means 86. Assembly 90 of bottom housing 80 and top housing 85 is shown in FIG. 12, having fastening means 89, puncturing and/or venting means 86, and an end on view of the pipe receiving means.

Figure 13:
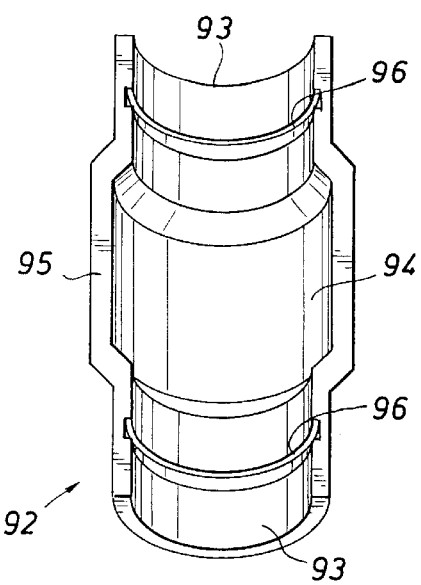
FIG. 13 shows a perspective view of a bottom housing of a fifth embodiment of a leak repairing device structured to repair leaks in copper tubing and the like, having sealing means.
Figure 14:
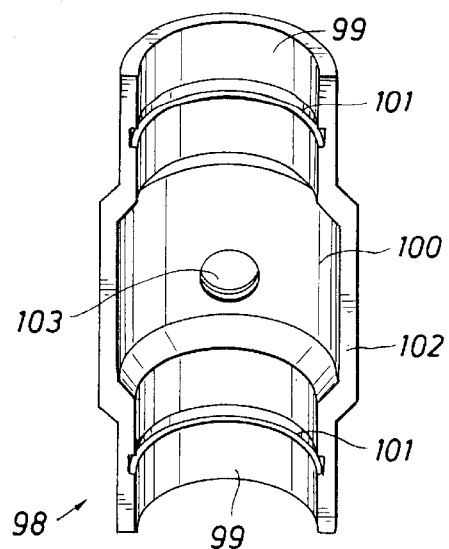
FIG. 14 shows a perspective view of a top housing of a fifth embodiment of a leak repairing device, having sealing means and means for puncturing the pipe being repaired and/or venting any excess pressure from gases, vapors or liquids from within a chamber surrounding such pipe.

A fifth embodiment of a leak repairing device of this invention is shown in FIGS. 13 thru 18 for applications involving copper tubing and the like. In FIG. 13, a housing 92 is shown, having pipe receiving means 93 disposed about distal ends of chamber 94. Seal engaging means 96 are structured to engage a sealing means to seal chamber 94. Chamber joining means 95 is shown in housing 92 for joining to another housing, such as housing 98 shown in FIG. 14. Housing 98 is shown in FIG. 14, having pipe receiving means 99 disposed about distal ends of chamber 100. Puncturing and/or venting means 103 are shown for puncturing a pipe having a leak and/or venting any gases from the chamber around such pipe. Seal engaging means 101 are structured to engage a sealing means to seal a chamber about the pipe having a leak. Chamber joining means 102 is shown in housing 98 (FIG. 14) for joining with chamber joining means 95 in housing 92 (FIG. 13).

Figure 15:
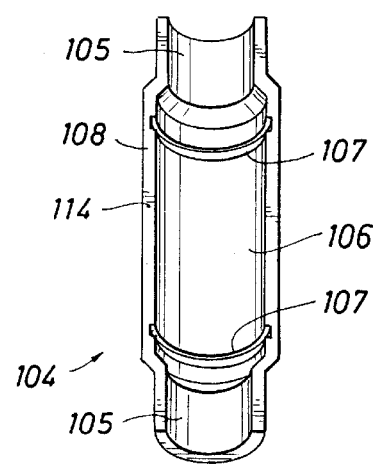
FIGS. 15 and 16, respectively, show perspective views of an alternative design of the devices shown in FIGS. 13 and 14, respectively, for repairing copper tubing of various lengths.
Figure 16:
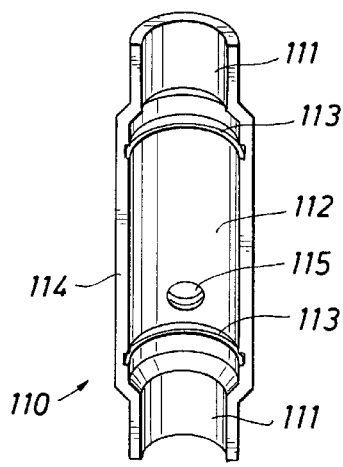

An alternate design for a leak repairing device is shown in FIGS. 15 and 16 for tubing of varying lengths. Housing 104 is shown having tubing receiving means 105 disposed about distal ends of chamber 106. Seal engaging means 107 are structured to engage a sealing means to seal chamber 106. Chamber joining means 108 is shown, in housing 104 for joining to another housing, such as housing 110 of FIG. 16. Housing 110 is shown having pipe receiving means 111 disposed about distal ends of chamber 112. Puncturing and/or venting means 115 are shown for puncturing a pipe having a leak and/or venting any gases from the chamber around such pipe. Seal engaging means 113 are structured to engage a sealing means to seal a chamber about the pipe having a leak. Chamber joining means 114 is shown in housing 110 (FIG. 16) for joining with chamber joining means 108 in housing 104 (FIG. 15).

Figure 17:
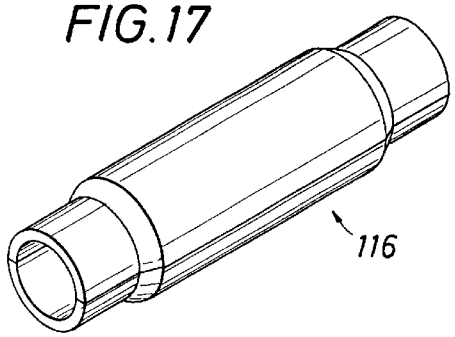
FIG. 17 shows a perspective view of an assembled housings of FIGS. 14 thru 16, inclusive, having means for puncturing the pipe being repaired and/or venting any excess pressure from gases, vapors or liquids from within a chamber surrounding such pipe.
Figure 18:
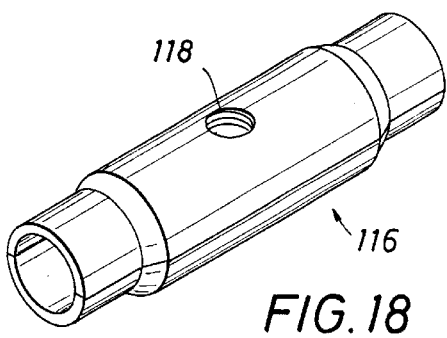
FIG. 18 shows another perspective view of the assembled housing of FIG. 16.

In FIG. 17, an assembly 116 of the housings 92 and 98 of FIGS. 13 and 14 or the housings 104 and 110 of FIGS. 15 and 16 are shown, wherein the chamber joining means 95 and 102 or chamber joining means 108 and 114 are sealed against each other using soldering, brazing, or the like. In FIG. 18, an alternative view of the assembly 116 is shown, having puncturing and/or venting means 117 shown.

A leak repairing device of this invention may be fabricated from structural materials such as carbon steel, copper, brass or aluminum, or the like.

Figure 19:
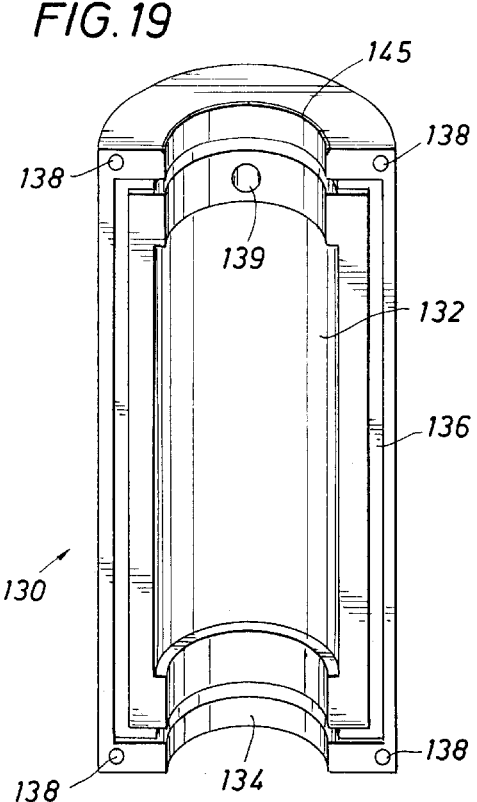
FIG. 19 shows a cutaway of a sixth embodiment of a leak repairing device, having sealing means and means for puncturing the pipe being repaired and/or venting any excess pressure from gases, vapors or liquids from within a chamber surrounding such pipe.

A sixth embodiment of a leak repairing device is shown in FIG. 19 as a housing 130 having pipe receiving means 134 at distal ends of chamber 132. The pipe receiving means 134 may have a beveled edge 145. The seal receiving means 136 may receive a sealing means 119, such as a Teflon® gasket similar to that shown in FIG. 4A, for sealing chamber 132. The chamber 132 also has a puncturing and/or venting means 139 for venting any vapors and/or gases which are emitted from a leaking pipe or tubing to be repaired. Joining means 138, such as Dowel pins, are provided to facilitate joining a pair of housings 130 which in turn may be sealed by any conventional methods such as soldering, brazing, or the like.

Figure 20:
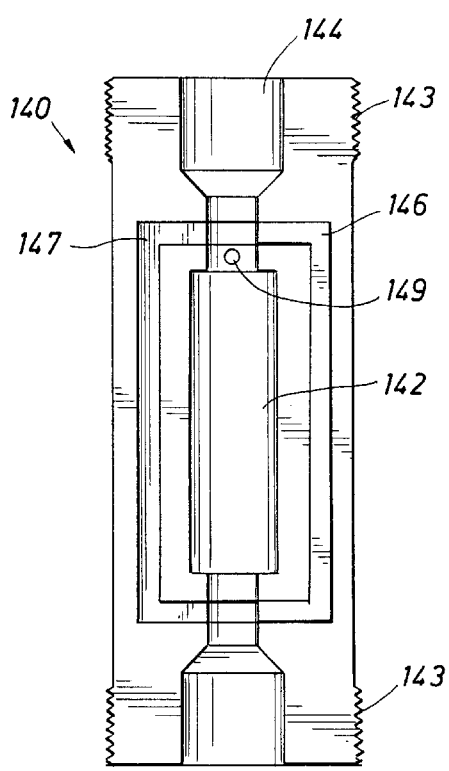
FIG. 20 shows a cutaway of a seventh embodiment of a leak repairing device, having threaded ends, sealing means, and means for puncturing the pipe being repaired and/or venting any excess pressure from gases, vapors or liquids from within a chamber surrounding such pipe.

A seventh embodiment of a leak repairing device is shown as a cutaway in FIG. 20 as a housing 140 having threaded ends 143 and an alternative design for sealing chamber 142. The sealing means is comprised of a male protrusion 146 and a female groove 147 having a continuous sealing means (not shown), such as a Teflon® gasket, disposed within the female groove 147. Means for venting the chamber 142 and/or puncturing the tubing to be repaired is provided for via puncturing and/or venting means 149. Pipe receiving means 144 is disposed about distal ends of the chamber 142.

Figure 21B:
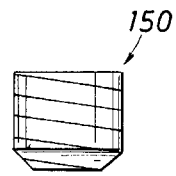
FIGS. 21A and 21B show still another preferred embodiment of a sealing means for a leak repairing device of FIG. 20.
Figure 21A:
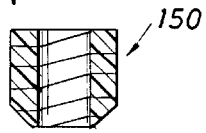

Sealing means 150 is shown as a helically cut Teflon® O-ring in FIGS. 21A (cutaway view) and 21B (side view), and may also be used to seal the chamber disposed about the pipe having a leak to be repaired.

Figure 22B:
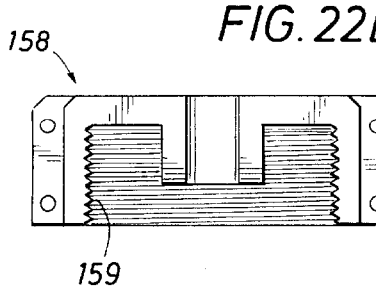
FIG. 22B shows a cutaway of a fastening means of a leak repairing device of FIG. 20.
Figure 22A:
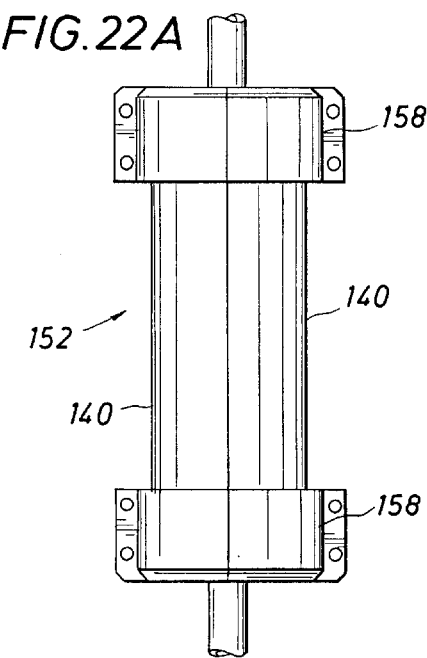
FIG. 22A shows an assembly of a leak repairing device of FIG. 20.

An assembly 152 of a pair of housings 140 is shown in FIG. 22A with a fastening means 158 shown as a split cap. A cutaway view of the fastening means 158 is shown in FIG. 22B as having mating threads 159.

Figure 23:
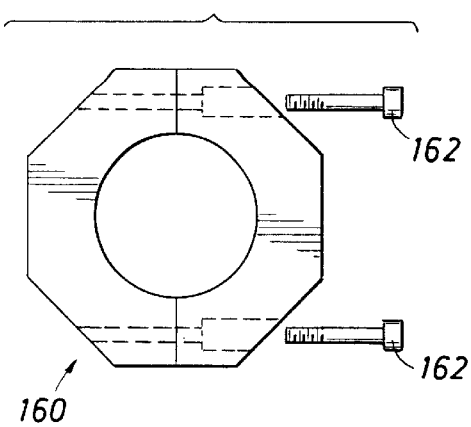
FIGS. 23 and 24 show a variety of housings and fastening means for a leak repairing device of this invention.
Figure 24:
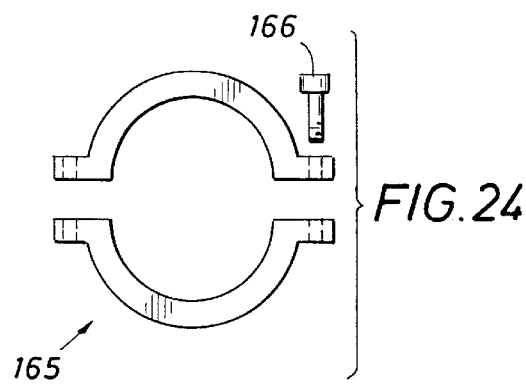

A variety of housings and fastening means are shown in FIGS. 23 and 24. In FIG. 23, a pair of octagonal housings 160 are shown with fastening means 162 comprising a screw, bolt, pins, or the like. In FIG. 24, a pair of circular housings 165 are shown with fastening means 166 comprising a screw, bolt, pins, or the like.

Figure 25:
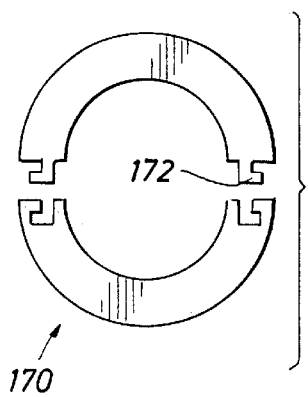
FIGS. 25 through 27 show a fastening means for slidingly locking together a pair of housings for a leak repairing device of this invention.
Figure 26:
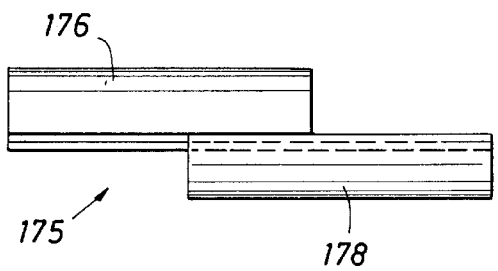
Figure 27:
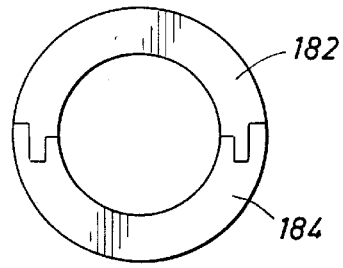

In FIG. 25, a pair of circular housings 170 are shown having fastening means 172 that may be slidingly locked together. A side view of circular housing 176 and 178 being slidingly locked together are shown in FIG. 26. An assembly 180 of a pair of circular housings 182 and 184 are shown in FIG. 27, having an alternative fastening means.

Figure 28:
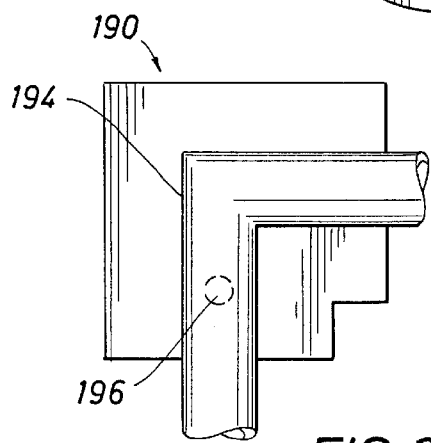
FIG. 28 shows an eighth embodiment of a leak repairing device of this invention for repairing a leak in a pipe elbow.

A leak repairing device of this invention is shown in FIG. 28 for a pipe elbow. An elbow housing 190 is shown installed about a pipe elbow 194. The elbow housing 190 has puncturing and/or venting means 196 for puncturing the pipe to be repaired and/or venting any gases or vapors.

Figure 29:
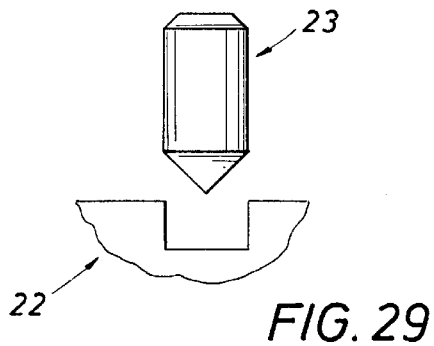
FIG. 29 shows a detail of a preferred embodiment of a vent port structure and means for puncturing the pipe being repaired and/or venting any excess pressure from gases, vapors or liquids from within a chamber surrounding such pipe.

Puncturing means 23 for puncturing the tubing or pipe to be repaired and/or venting any refrigerant vapors and/or gases to chamber 12 is shown in FIG. 29. The tubing or pipe is punctured to prevent any pressure differentials from forming between chamber 12 and the portion of tubing being repaired. The puncturing and/or venting means 22 may be connected to a gas and/or vapor reclamation unit (not shown) to contain any vented gases, such as CFC or HCFC, and to prevent such gases and/or vapors from escaping to the atmosphere.

The foregoing disclosure and description of the invention are illustrative and explanatory thereof, and various changes in the size, shape, and materials, as well as in the details of the illustrated device may be made without departing from the spirit of the invention. Further, the leak repairing device of this invention may be applied to any type of conduit having a leak such as plumbing or water pipes and the like. The invention is claimed using terminology that depends upon a historic presumption that recitation of a single element covers one or more, and recitation of two elements covers two or more, and the like. Also, the drawings and illustration herein have not been produced to scale.

What is claimed is:

1. A device for repairing leaks in pressurized tubing, comprising:
   an adjustable housing structured to encircle a tubing portion, defining a chamber around a portion of encircled tubing;
   an unbroken sealing element sealing a housing to housing portions tubing to housing portions of the device; and
   means attached to the housing for puncturing a portion of the tubing or venting gasses from the chamber.

2. The device of claim 1 wherein the adjustable housing comprises split housing portions structured to combine to encircle the tubing portion.

3. The device of claim 1 wherein the adjustable housing comprises a sealing element structured to engage a mating surface on a second adjustable housing and to encircle a portion of tubing.

4. The device of claim 1 wherein the means is in fluid communication with a gas and/or vapor reclamation unit.

5. The device of claim 1 wherein the sealing means includes a gasket.

6. The device of claim 1 wherein the sealing means is selected from the group including brazing and soldering.

7. The device of claim 1 wherein the tubing portion comprises tubing having an outer diameter from about 1/8 of an inch to about three inches.

8. The device of claim 1 wherein the tubing portion comprises pressurized refrigeration system tubing.

9. The device of claim 1 wherein the means for sealing tubing to housing portions includes end caps structured to encircle end portions of the housing.

10. A method for repairing leaks in pressurized tubing, comprising:
    encircling a portion of leaking tubing with a housing such that the housing defines a chamber around a portion of encircled pressurized tubing;
    sealing the housing to itself and to the tubing with an unbroken sealing element;
    and
    puncturing a portion of the tubing within the chamber to permit substantially free fluid communication between the tubing and the chamber.

11. The method of claim 10 wherein the sealing includes at least one of brazing and soldering portions of tubing to portions of housing.

12. The method of claim 10 wherein the sealing includes at least one of brazing and soldering housing to housing portions.

13. The method of claim 10 that includes bleeding fluid from the chamber defined by the housing around a portion of tubing during at least a portion of the sealing.

14. A device for repairing leaks in pressurized tubing, comprising:
    an adjustable housing structured to encircle a tubing portion, defining a chamber around a portion of encircled tubing;
    an unbroken sealing element sealing housing to housing portions of the device;
    sealing means for sealing a tubing to housing portions of the device; and means attached to the housing for puncturing: a portion of the tubing or venting gasses from the chamber.

15. The device of claim 14 wherein the sealing means includes brazing or soldering.

* * * * *